United States Patent

Muehllehner

[15] 3,683,185
[45] Aug. 8, 1972

[54] RADIATION IMAGING APPARATUS

[72] Inventor: Gerd Muehllehner, Glenview, Ill.

[73] Assignee: Nuclear-Chicago Corporation, Des Plaines, Ill.

[22] Filed: Aug. 8, 1969

[21] Appl. No.: 848,595

[52] U.S. Cl. .......................... 250/71.5 R, 250/213 VT
[51] Int. Cl. ................................................. G01t 1/20
[58] Field of Search ..250/71.5, 71.5 S, 213 VT, 83.3

[56] References Cited

UNITED STATES PATENTS

| | | | |
|---|---|---|---|
| 3,011,057 | 11/1961 | Anger | 250/71.5 |
| 3,369,124 | 2/1968 | Dueker | 250/211 |
| 3,462,601 | 8/1969 | Sternglass | 250/213 X |
| 3,531,651 | 9/1970 | Lieber et al. | 250/71.5 S |

Primary Examiner—James W. Lawrence
Assistant Examiner—Davis L. Willis
Attorney—Lowell C. Bergstedt, Walter C. Ramm and Helmuth A. Wegner

[57] ABSTRACT

An image intensifier type of gamma ray scintillation camera employing a relatively thick scintillation crystal at the input end for good efficiency in converting gamma rays into scintillations and a fast, position sensitive photodiode with computer circuitry at the output end for producing coordinate electrical signals representing the centroid of the relatively large light spot striking the photodiode. Pulse height analysis is performed on the total sum signal from the photodiode to reject unwanted events manifested at the output of the photodiode, and appropriate ratio computing circuitry is employed to maintain a constant image size over a range of intensities of light spots striking the photodiode.

3 Claims, 6 Drawing Figures

INVENTOR
Gerd Muehllehner
BY Lowell C. Bergstedt
ATTORNEY

RADIATION IMAGING APPARATUS

Gamma ray imaging is rapidly becoming an increasingly important and popular diagnostic procedure in medical research laboratories and hospitals throughout the world. In the early days of in vivo radioisotope imaging the rectilinear scanner was the only apparatus available, and diagnostic procedures using this type of device were time consuming and uncomfortable for the patient. With the development of the Anger scintillation camera, U.S. Pat. No. 3,011,057, and the production of improved versions of that device, radiation imaging became a popular technique, primarily because of the rapidity with which a scintillation camera could produce a high quality image of a static radioisotope distribution and the ability of the scintillation camera to image relatively fast changes in a dynamic distribution. Other types of scintillation cameras have been developed, but none of them have thus far achieved the prominence of the Anger camera because of one or more limitations inherent in the present forms of such devices.

Even before the advent of the Anger scintillation camera attempts were made to use an image amplification tube like those used for X-ray image amplification with a mosaic of scintillation crystals on the outer front surface of the tube and a photocathode deposited directly on the inner front surface thereof. Such an instrument was far too low in sensitivity to be used in a diagnostic situation with small quantities of injected radioisotopes. Improvements in image intensifier tubes came along to provide the degree of amplification necessary to achieve good sensitivity from a photon-electron conversion standpoint, and image intensifier systems employing a very thin crystal inside the intensifier tube with a photocathode deposited on the back surface of the crystal were produced. The image on the output phosphor was viewed by a camera or an image orthicon tube with the final image displayed on a cathode ray tube for photographic purposes. The thin crystal was required to avoid a large spot of light striking the photocathode and thus producing a poor image composed of large dots. As a result of the thin crystal, however, the sensitivity of this device was still quite low, especially for high energy radiations, because a thin crystal is capable of converting relatively few gamma rays of such energy into scintillations. A more important limitation of the device was the lack of pulse height selection which meant that all events were imaged regardless of their origin or energy, and the resulting high background essentially limited the usefulness of the device to dynamic imaging.

Other attempts have been made to use image amplifier tubes by using large lenses to focus the scintillation in a crystal onto the photocathode, but such lenses are inefficient in transferring the light to the photocathode so the sensitivity is low and pulse height selection is difficult. All of the attempts made to adapt image intensifier technology to scintillation cameras have been based on the recognition of the inherent high resolution capability of the image intensifier, but these attempts have thus far failed to produce a camera having the sensitivity of the Anger camera with pulse height selection and improved resolution.

Therefore, it is the object of this invention to provide an improved image intensifier type of scintillation camera.

It is a further object of this invention to provide an image intensifier scintillation camera having high sensitivity and resolution with effective pulse height selection.

A preferred embodiment of the invention features the provision, at the input end of an image intensifier, of a relatively thick scintillation crystal to provide high gamma ray detection efficiency together with the provision, at the output end, of a position sensitive means viewing the output phosphor screen and producing first and second pairs of electrical signals representing the coordinates of the centroid of each light flash occurring on the screen and the intensity of each such light flash. The term "relatively thick scintillation crystal" means that the dimension of the scintillation crystal in the direction of the ordinary path of gamma rays impinging on the crystal is of a magnitude such that a large fraction of incident gamma rays will lose all of their energy in the crystal as a result of one or more electron recoil events. For gamma rays in the 100–300 KEV range the scintillation crystal may be, for example, one-half inch thick, solid sodium iodide or cesium iodide (both of which may be activated with thallium). The scintillation crystal may be located outside or inside the envelope of the image intensifier, with light coupling media between the crystal and the photocathode if the crystal is outside the envelope, and with the photocathode preferable deposited directly on the crystal if the crystal is inside the envelope.

The use of a relatively thick scintillation crystal results in a spreading of the light from the scintillation as it travels to the photocathode, and thus a relatively large diameter spot or flash of light will be produced on the output phosphor screen. The size of this spot would be highly detrimental to image quality (resolution) in the camera systems of the prior art, but in the system of this invention the position sensitive means viewing the output phosphor screen provides signals which tell the coordinates of the centroid of the large light spot which, in turn, are substantially the coordinates of the scintillation occurring in the crystal (taking into consideration factors of scale down of the image, etc.). Thus, in an image intensifier type of scintillation camera in accordance with this invention, an advantageously thick scintillation crystal may be used to provide high gamma ray detection efficiency without sacrificing the high inherent resolution capabilities of the system.

A "position sensitive means" preferably comprises a position sensitive diode of the same general character as the devices disclosed in U.S. Pat. Nos. 3,354,313 and 3,369,124, with a biasing circuit appropriate to the production of short pulses. A position sensitive diode may have four output electrodes together with a common bias electrode. When used with the appropriate biasing circuit, the position sensitive diode will produce four output signals on the four output electrodes in accordance with the coordinates of the centroids of a spot of light impinging on the diode. These four output signals may be designated $(x+)$, $(x-)$, $(y+)$ and $(y-)$, and their respective magnitudes will be such that a signal corresponding to $(x+)-(x-)$ will be proportional to the $x-$ coordinate of the centroid and a signal corresponding to $(y+)-(y-)$ will be proportional to the $y-$ coordinate of the centroid. These difference signals will also have the appropriate polarity to indicate the signs of the respective coordinates.

The sum of all the four output signals is proportional to the intensity of the light flash, so pulse height selection can be accomplished advantageously by summing the outputs and analyzing the resultant pulse in a single channel pulse height analyzer.

Position sensitive diodes are available in forms in which the fraction of energy going into the $x$ and $y$ coordinate signals, respectively, either varies as a function of the coordinates of the centroid of the light spot or is constant. When using the former type, it is preferably to normalize the difference signals to produce intensity and position independent coordinates by computing a ratio in accordance with the following equations:

$$X = \frac{(x+)-(x-)}{(x+)+(x-)}$$
$$Y = \frac{(y+)-(y-)}{(y+)+(y-)} \qquad \text{(E-1)}$$

When using the latter type of diode, it is preferable to normalize the difference signals to produce intensity and position independent coordinates by computing a ratio in accordance with the following equations:

$$X = \frac{(x+)-(x-)}{Z}$$
$$Y = \frac{(y+)-(y-)}{Z}$$
$$Z = (x+)+(x-)+(y+)+(y-) \qquad \text{(E-2)}$$

The four outputs from the position sensitive diode are preferably coupled to separate low noise, charge sensitive preamplifiers and from thence to one or more amplifier stages. The resultant four pulses may then be passed through gated pulse stretcher circuits which may each comprise a delay circuit, a linear gate and pulse stretcher with the linear gate controlled by the output of the pulse height analyzer operating on the summed signal. In this manner only pulses resulting from a selected range of light spot intensities will be stretched. The four stretched output pulses may then be fed to computing circuitry which will produce X and Y pulses in accordance with an appropriate one of the sets of Equations (E-1) or (E-2) above. The X and Y pulses may be displayed on a cathode ray tube with the unblanking signal derived from output of the pulse height analyzer or they may be digitized and recorded in various real time or accumulated fashions such as on video tape or in a memory. If displayed on a CRT, a sequence of pulse displays may be integrated on photographic film to produce an image of the radioactivity distribution viewed by the crystal at the input end of the system.

Other forms of "position sensitive means" may also be used, such as an array of photomultiplier tubes viewing the output phosphor screen in a manner similar to the Anger camera's photomultiplier tubes viewing the scintillator. Depending on the form of the photomultiplier array, final X and Y coordinate signals may be developed in accordance with one of the sets of Equations (E-1) or (E-2).

It should be apparent that an image intensifier type of scintillation camera in accordance with this invention obviates all of the limitations of previous forms of this type of camera. The sensitivity is good because a relatively thick crystal is employed, the resolution is good because the centroid of the relatively large light spot on the output phosphor screen is computed, and image quality is good in static radioisotope imaging situations because effective pulse height selection may be performed.

Other objects, features, and advantages of this invention will be apparent from a consideration of the following detailed description together with the accompanying drawings in which.

Figure 1:
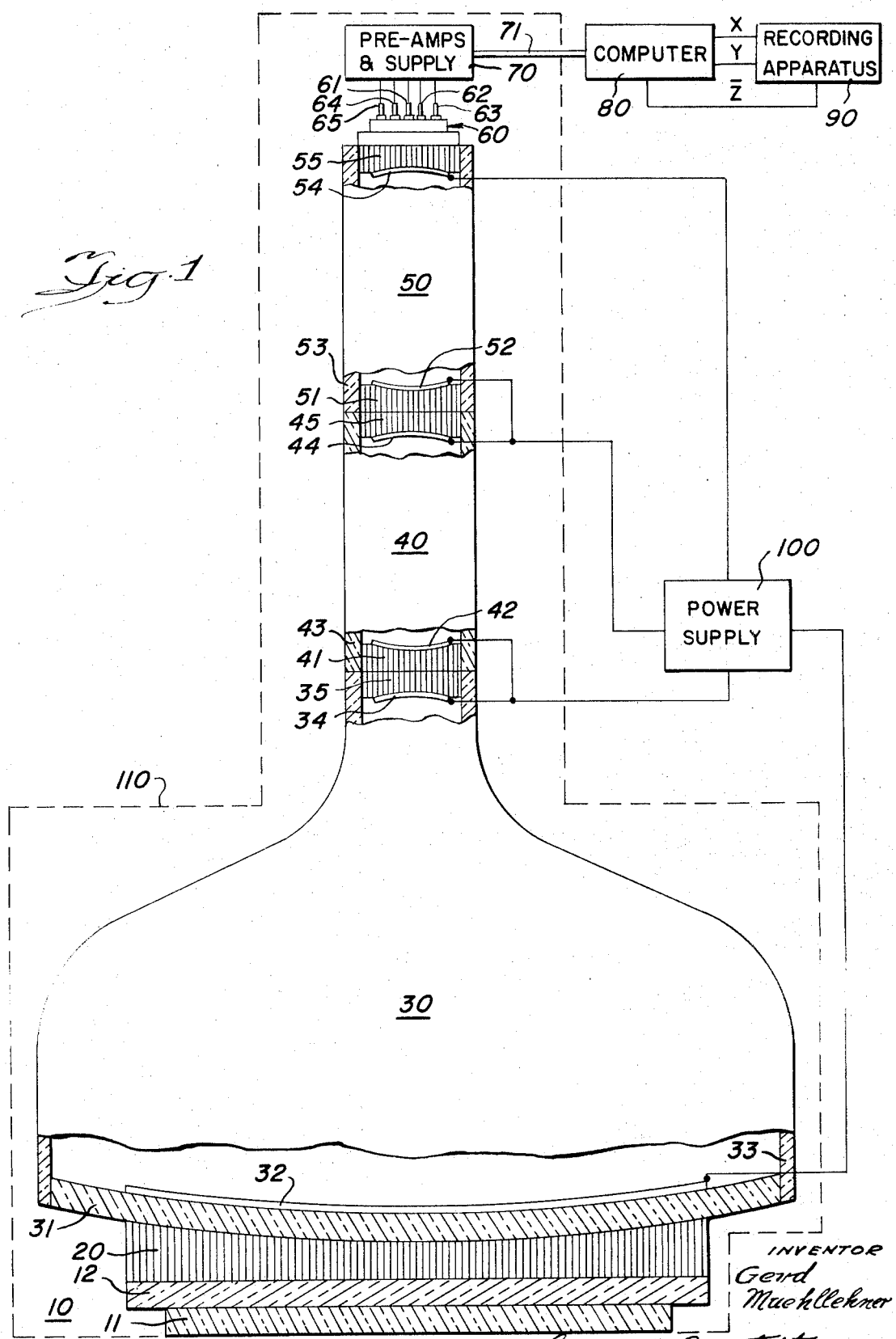
FIG. 1 is a schematic elevational view, partly sectioned, of a radiation imaging device in accordance with this invention.

In FIG. 1 the system of this invention is shown as comprising essentially a scintillation crystal assembly 10, a fiber optic light guide 2, a three stage image intensifier system comprising intensifier tubes 30, 40, and 50, a position sensitive photodiode 6, output circuitry comprising pre-amps and supply circuitry 70 for the photodiode, computer circuitry 80, recording apparatus 90, and intensifier power supply 100. The numeral 110 designates a light tight, shielded enclosure for the system which may be constructed in accordance with well-known principles and well-understood requirements.

Crystal assembly 10 comprises essentially a cylindrical sheet 11 of a scintillation crystal such as NaI (Tl) and a cylindrical glass cover plate 12. The scintillation crystal may be approximately 9 inches in diameter and one-half inch thick. Crystal assemblies of this general type are commercially available from Harshaw Chemical Company, Cleveland, Ohio. It should of course be understood that numerous other mechanical features of crystal assembly 10 are not shown in the drawings and need not be shown because they are well-known to those familiar with this art and with the availability of such assemblies. It should also be understood that some form of radiation collimator, such as a pin-hole collimator, a multichannel parallel hole collimator, a multichannel diverging collimator, or a multichannel focussed collimator, would usually be interposed between crystal 11 and a body of radioactivity to be imaged.

Fiber optic light guide 20 comprises essentially a cylindrical array of closely packed optical fibers which serves to transmit a light distribution image from the top of glass plate 12 to the bottom or outside surface of a glass input window 31 of intensifier tube 30. Intensifier tube 30 comprises a glass (or other light transparent material) input window 31, a glass housing 33 in which input window 31 is sealed, a electron emitting cathode 32 deposited on the inner surface of input window 31, a light emitting phosphor anode 34 at the output end, and a fiber optic light guide 35 sealed in at the output end to transmit the light from anode 34. Other features of intensifier tube 30 such as electrostatic or magnetic focusing structures are not shown. Image intensifier tubes of this general character are available from the Rauland Corporation, Chicago, Illinois, as well as other sources.

A gamma ray incident on the bottom surface of crystal 11 will enter the crystal and either pass through the crystal or undergo one or more scatterings, typically called recoil events. If the ray passes through the crystal no scintillation is produced; but if a recoil event occurs, the recoil electron will produce a scintillation or light flash in the crystal. Recoil events may be either Compton or photoelectric events depending upon whether the ray imparts only some or all, respectively, of its energy to the recoil electron, and a given gamma ray may undergo a series of Compton recoils and then escape the crystal or, more probably, produce a final photoelectric recoil in the crystal. If a gamma ray gives up all of its energy in the crystal in one or more recoil events, this will be termed a photopeak event; and if a gamma ray gives up only part of its energy in the crystal and then escapes, this will be called a Compton event. The intensity of the scintillation produced by a gamma ray interacting in the crystal will depend on whether a photopeak event or a Compton event occurs, i.e., the number of photons produced at the location of the interaction will depend on the nature of the event and, of course, on the energy of the incident gamma ray. In the typical gamma ray imaging procedure it is desired to image the distribution of a radioisotope which emits a characteristic gamma ray of a particular energy as it decays, and this is accomplished most faithfully (with the lowest background and highest resolution) by an imaging apparatus that can distinguish between a photopeak event produced in the crystal by a characteristic gamma ray, and events of greater or lesser intensity, which may be Compton events of the characteristic gamma ray, or photopeak and Compton events produced by background radiation such as cosmic rays, characteristic rays scattering before entering the crystal, etc.

When a scintillation of a particular intensity occurs in crystal 11, light photons will be generated at the location of the scintillation and will go off in all directions. A reflective surface is usually provided at the bottom of crystal 11, and the indices of refraction of crystal 11, glass cover 12, light guide 20, input window 31, and the optical grease usually used between these elements are generally matched as closely as possible so that photons from a scintillation are efficiently transmitted to cathode 32. The distribution of intensity of photons from a scintillation arriving at photocathode 32 will be such that the highest intensity will be located at a point immediately above the location of the scintillation and the intensity will remain fairly constant in a small circular area surrounding that point and then drop off as a function of radial distance from that point. For purposes of this discussion, the light striking the photocathode may be considered a circular spot with greatest intensity at its centroid which corresponds to the location of the scintillation. In this case the spot is rather large because of the distance from the crystal to the photocathode, although the optical fiber medium 20 prevents spreading of the light in passing through that region.

The spot of light incident on photocathode 32 causes an emission of electrons therefrom in a distribution corresponding to the light intensity distribution. These electrons are accelerated through a high potential difference between cathode 32 and anode 34 which is produced by power supply 100. Typically, an amount of focussing is also accomplished by well-known means so that accelerated electrons will strike a relatively smaller area of anode 34 where the electron distribution will be converted to a light distribution or another light spot. Fiber optics medium 35 will couple the light spot to the output end of intensifier tube 30. Of course, the position of the light spot produced on anode 35 corresponds to the position of the light spot striking photocathode 32 although a mirror image may be involved; and the intensity of the light spot on anode 35 will be greater than that of the light spot striking the photocathode by an amount proportional to the gain of the intensifier tube.

Intensifier tubes 40 and 50 are essentially identical. They comprise cylindrical housings 43, 53; input fiber optic windoes 41, 51; photocathodes 42, 52; light emitting phosphor anodes 44, 54; and output fiber optic windoes 45, 55; together with any focusing structures or apparatus required. These tubes are also available from various commercial sources although certain defense material priorities may limit their availability. At this point it should be mentioned that the phosphor anodes 34, 44, and 54 are preferably composed of a fast decay phosphor (e.g., 1 microsecond decay time) so that the response of the multistage system will be rapid enough to handle high count rates.

A light spot entering input window 41 will cause electrons to be emitted from photocathode 42, which electrons will be accelerated by the potential difference between cathode 42 and anode 44 and produce a more intense spot of light on anode 44. This spot of light is coupled through output window 45 and input window 51 to photocathode 52. The light-electron-light process is repeated in tube 50 so that a considerably intense spot of light appears on phosphor anode 54 and is coupled into position sensitive photodiode 60. It should be understood that a strict spatial coordinate correspondence exists between the location of the scintillation in crystal 11 and the centroid of the light spot on output phosphor screen or anode 54 and the intensity of the light spot on anode 54 is proportional to the intensity of the original scintillation with the constant of proportionality depending upon the overall gain of the image intensifier system. It should be understood that optical coupling grease is used where needed throughout the system to optimize light coupling.

Position sensitive photodiode 6 transduces the spot of light coupled from anode 54 to its light sensitive surface into four electrical signals which contain information from which the coordinates of the centroid of the spot and the intensity of the spot may be determined. These four signals appear on output leads 62, 63, 64, and 65 and are coupled through preamplifier and amplifier circuitry 70 and via separate leads in a cable 71 to computer circuitry 80. Computer circuitry 80 develops final coordinate signals X and Y representing the coordinates of the centroid of the light spot and a trigger signal Z for at least some of the light spots on anode 54 in a manner to be described below. The X and Y signals may be recorded in any of the well-known ways be recording apparatus 90.

The scintillations occurring in crystal 11 are processed on a one-at-a-time basis in a matter of a few microseconds. The response of the overall system is such that computer circuitry 80 may incorporate a pulse height selector to eliminate from the final output those scintillation events which are unwanted. It has been determined that, for attainable overall gains in the image intensifier stages, it is possible to construct an imaging system in accordance with this invention which will have better spatial resolution than that achieved with the present commercial versions of the Anger camera with essentially no sacrifice of sensitivity or linearity.

Figure 2:
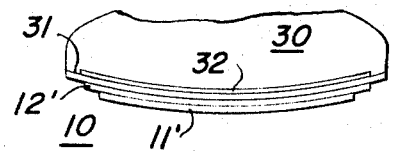
FIG. 2 is a schematic elevational view of an alternate form of crystal and image intensifier configuration.

In FIG. 2, it is shown that fiber optic medium 20 could be eliminated by curving crystal 11' and glass plate 12' to match the curvature of window 31. This would result in more efficient light coupling, but difficulties are involved in producing the curved crystal from a flat sheet and considerable expense would be involved in machining a thicker crystal to this configuration. Of course, if input window 31 were able to be made flat and still withstand the pressure due to the evacuated interior of tube 30, the flat crystal configuration could be mated directly to the glass input window.

Figure 3:
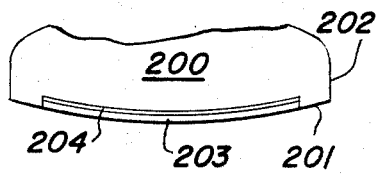
FIG. 3 is a schematic elevational view of another alternate form of crystal and image intensifier configuration.

FIG. 3 shows a crystal-intensifier system in which crystal 203 is mounted in the interior of tube 200 with a photocathode 204 deposited directly thereon. From the standpoint of light and electron optics this is likely to be the most efficient form of the invention. Input window 201 need not have optical characteristics and could be of a material which rather readily allows gamma rays to pass therethrough undisturbed.

Figure 4:
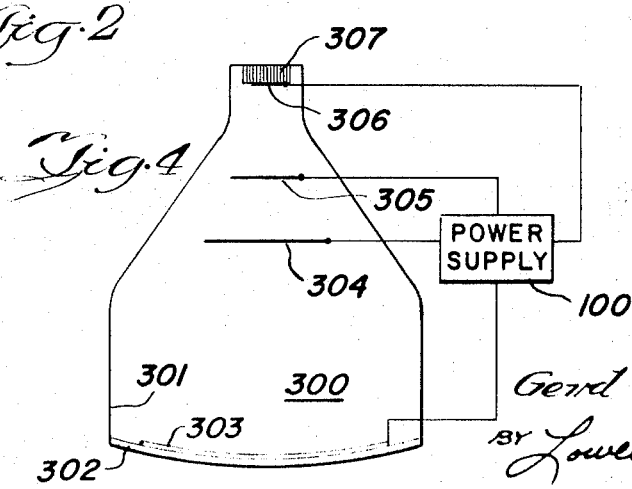
FIG. 4 is a schematic elevational view of an alternate form of image intensifier tube.

In FIG. 4, an alternate form of multi-stage intensifier system is shown. Intensifier 300 has input window 302 and photocathode 303 as in tube 30, but housing 301 includes a plurality of electron amplifying electrodes 304 and 305 between photocathode 303 and output phosphor screen 306. Electron multiplication takes place at electrodes 304 and 305, but substantially all of the electrons continue to travel in the same direction so that minimal defocussing of the final light spot is produced. Other structures for focusing between stages are not shown in this schematic representation of a single tube design which is available to replace the three separate tubes shown in FIG. 1 and accomplish substantially the same result.

Figure 5:
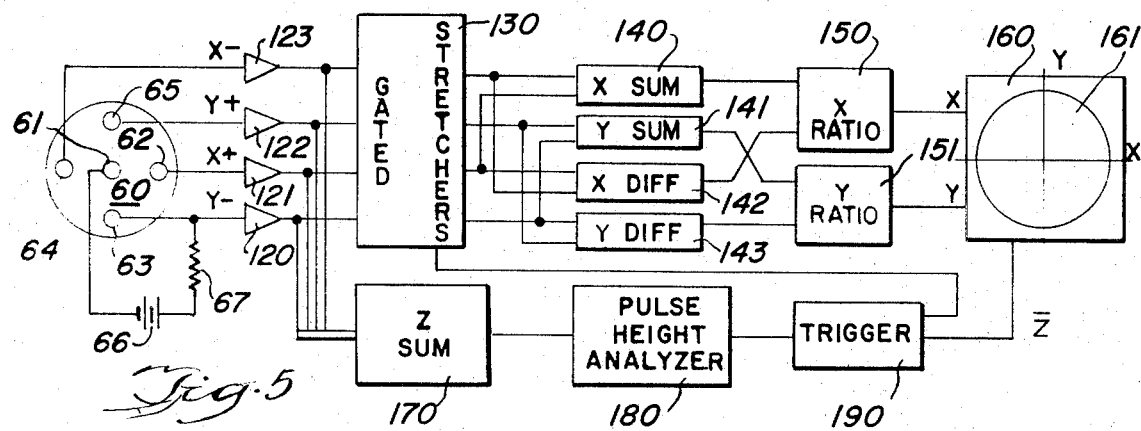
FIG. 5 is a block schematic diagram of one form of output circuitry in accordance with this invention.

In FIG. 5, a block diagram of output circuitry for use with one form of position sensitive diode is shown. In this case diode 60 is of the type in which the sum $(x+) + (x-) + (y+) + (y-)$ is substantially independent of the location of an impinging light flash of constant intensity, but the difference signal $(x+) - (x-)$ is not a linear function of the $x-$ coordinate of the light spot and similarly for the $y-$ coordinate. Thus, in order to linearize and normalize the difference signals, it is required to develop signals corresponding to the Equations (E-1) given above.

For this invention, position sensitive diode 60 may be a "PIN-SPOT/10" detector manufactured by United Detector Technology of Santa Monica, Calif. Biasing for diode 60 is accomplished by providing a DC voltage from a battery 66 or other DC voltage source between pin 61 and pin 63 through a resistor 67. This effects a steady DC bias across the diode since pins 62, 63, 64, and 65 are coupled to a common resistive element internal to the diode. The operating mechanisms for the diode will not be described here because they are well-described in the above-referenced patents and other published literature.

Output signals from the four output electrodes 62–64 are coupled to appropriate amplifying circuits 120–123, and the outputs of amplifying circuits 120–123 are coupled to gated stretchers 130 and Z SUM circuit 170. The outputs of gated stretchers 130, when gated on, are stretched versions of the amplified $(x+), (x-), (y+), (y-)$ signals. The stretched versions of the $(x+)$ and $(x-)$ signals are each fed to X SUM circuit 140 and X DIFF. (difference) circuit 142, while the $(y+)$ and $(y-)$ signals are each fed to Y SUM circuit 141 and Y DIFF. (difference) circuit 143. The outputs of the X-SUM and X-DIFF circuits are proportional to $(x+) + (x-)$ and $(x+) - (x-)$, respectively, and these outputs are coupled to X RATIO circuit 150 which develops an output signal X proportional to $(x+) - (x-)$ divided by $(x+) + (x-)$. The treatment of the $(y+)$ and $(y-)$ signals is the same to produce an output Y from Y RATIO circuit proportional to $(y+) - (y-)$ divided by $(y+) + (y-)$. The X and Y signals may be recorded in any known fashion or displayed on face 161 of cathode ray tube apparatus 160.

Z SUM circuit 170 adds the four amplified outputs and produces a signal proportional to the intensity of the light spot. This signal is fed to a pulse height analyzer 180 which may be set to respond to input signals in a selected range corresponding to a range of incident light spot intensities. Output signals from P.H.A. 180 are fed to a trigger circuit which functions to gate the stretchers and at an appropriate time to provide a Z signal to unblank the CRT. Gated stretchers 130 include individual delay circuits to permit the pulse height analysis to be performed before the signals are presented for acceptance by the gates. All of the circuits shown in block form in FIG. 5 are standard, well-known circuits, and many of them are found in present commercial versions of the Anger camera.

Figure 6:
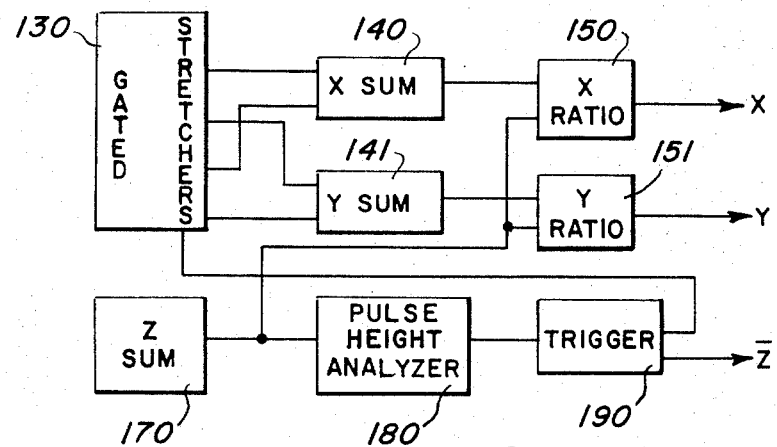
FIG. 6 is a block schematic diagram of an alternate form of output circuitry in accordance with this invention.

FIG. 6 shows the circuitry for processing output signals from a position sensitive photo diode which is constructed and functions such that the $x$ and $y$ difference signals are linear functions of position and ratios can be computed by using the total sum of output signals. Other than for this aspect the two systems are essentially identical.

It should be understood that the above descriptions of preferred and alternate embodiments of this invention are given by way of example only and numerous modifications could be made therein without departing from the scope of this invention as claimed in the following claims.

I claim:

1. In combination in a gamma ray camera:
    an image intensifier system, including an input photocathode on an inside surface of a curved entrance window of said system and an output phosphor screen, operative in response to an input light distribution on said photocathode to produce an intensified version of said distribution on said screen;

a crystal assembly comprising a scintillation crystal in the form of a flat continuous disc and a glass cove in the form of a flat disc mounted on said crystal;

a light pipe comprising a plurality of glass rods coupling said flat glass cover of said crystal assembly to said curved entrance window of said intensifier system so that a gamma ray interacting with said crystal produces a light flash which results in a light spot on said photocathode and a corresponding intensified version of said light spot on said screen, the centroid of said light spot on said photocathode being at the spatial coordinates of the point of interaction of said gamma ray with said crystal; and a position sensitive photodiode coupled to said output phosphor screen to produce output electrical signals representing said spatial coordinates and the amount of energy deposited in said crystal by said gamma ray.

2. Apparatus as claimed in claim 1, wherein said output signals from said photodiode comprise first and second pairs of signals, said first pair representing $(x+)$ and $(x-)$ coordinate information and said second pair representing $(y+)$ and $(y-)$ coordinate information, and the sum of said first and second pairs of signals representing said amount of energy; and further comprising:

first and second circuit means receiving said first and second pairs of signals, respectively, for producing X and Y coordinate signals in accordance with the following equations:

$$X = \frac{(x+)-(x-)}{(x+)+(x-)}$$

$$Y = \frac{(y+)-(y-)}{(y+)+(y-)}$$

third circuit means receiving said first and second pairs of signals for producing a Z signal in accordance with the following equation:

$$Z = (x+)+(x-)+(y+)+(y-);$$

a pulse height analyzer receiving said Z signal for producing a trigger signal when the magnitude of said Z signal corresponds to a gamma interaction in a selected energy band; and a cathode ray tube for displaying a light spot in a position signaled by said X and Y signals when said tube is triggered by said trigger signal.

3. Apparatus as claimed in claim 1, wherein said output signals from said photodiode comprise first and second pairs of signals, said first pair representing $(x+)$ and $(x-)$ coordinate information and said second pair representing $(y+)$ and $(y-)$ coordinate information, and the sum of said first and second pairs of signals representing said amount of energy; and further comprising:

first circuit means for summing said first and second pairs of signals to produce a Z signal representing said amount of energy;

second and third circuit means receiving said first and second pairs of signals, respectively, and each receiving said Z signal for producing X and Y coordinate signals in accordance with the following equations:

$$X = \frac{(x+)-(x-)}{Z}$$

$$Y = \frac{(y+)-(y-)}{Z}$$

a pulse height analyzer receiving said Z signal for producing a trigger signal when the magnitude of said Z signal corresponds to a gamma interaction in a selected energy band; and a cathode ray tube for displaying a light spot in a position signalled by said X and Y signals when said tube is triggered by said trigger signal.

* * * * *